United States Patent
Walker

(10) Patent No.: US 9,606,807 B2
(45) Date of Patent: Mar. 28, 2017

(54) DIRECT COMMUNICATION WITH A PROCESSOR INTERNAL TO A MEMORY DEVICE

(75) Inventor: Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 1019 days.

(21) Appl. No.: 12/478,450

(22) Filed: Jun. 4, 2009

(65) Prior Publication Data

US 2010/0312998 A1  Dec. 9, 2010

(51) Int. Cl.
*G06F 9/38* (2006.01)
*G06F 15/78* (2006.01)

(52) U.S. Cl.
CPC ........ *G06F 9/3877* (2013.01); *G06F 15/7821* (2013.01); *Y02B 60/1207* (2013.01); *Y02B 60/1225* (2013.01)

(58) Field of Classification Search
CPC .......................... G06F 9/3877; G06F 15/7821
See application file for complete search history.

(56) References Cited

U.S. PATENT DOCUMENTS

| | | | |
|---|---|---|---|
| 5,528,550 A * | 6/1996 | Pawate et al. | 365/230.03 |
| 6,279,088 B1 * | 8/2001 | Elliott et al. | 711/155 |
| 2004/0215852 A1 | 10/2004 | Klein | |

OTHER PUBLICATIONS

Nyasulu et al., Architecture and Implementation of a Computational RAM Controller, Department of Electronics, Carleton University, Ottawa, Canada, 1998, 6 pages.*
Draper et al., "The Architecture of the DIVA Processing-In-Memory Chip", 2002, ACM.*
Hall et al., "Mapping Irregular Applications to DIVA, PIM-based Data-Intensive Architecture", 1999, ACM.*
Elliott D G, et al.; Computational RAM: Implementing Processors in Memory IEEE Design & Test of Computers; Sevices Center, New York, NY, US, vol. 16, No. 1, Jan. 1, 1999, pp. 32-41.
U.S. Appl. No. 12/478,465, filed Jun. 4, 2009, Walker.
U.S. Appl. No. 12/478,412, filed Jun. 4, 2009, Walker.
U.S. Appl. No. 12/478,527, filed Jun. 4, 2009, Walker.
U.S. Appl. No. 12/478,532, filed Jun. 4, 2009, Walker.
U.S. Appl. No. 12/478,457, filed Jun. 4, 2009, Walker.
U.S. Appl. No. 12/603,376, filed Oct. 21, 2009, Walker et al.
U.S. Appl. No. 12/603,393, filed Oct. 21, 2009, Walker et al.

* cited by examiner

*Primary Examiner* — Benjamin Geib
(74) *Attorney, Agent, or Firm* — Fletcher Yoder, P.C.

(57) ABSTRACT

Devices, systems, and methods of communicating information directly to a sequencer or a buffer in a memory device are provided. In some embodiments, instructions are sent directly from an external processor to a sequencer in the memory device, and the sequencer configures the instructions for an internal processor, such as one or more arithmetic logic units (ALUs) embedded on the memory device. Further, data to be operated on by the internal processor can be sent directly from the external processor to a buffer, and the sequencer can copy the data from the buffer to the internal processor. As power can be consumed each time a memory array is written to or read from, the direct communication of instructions and/or data can reduce the power consumed in writing to or reading from the memory array.

29 Claims, 4 Drawing Sheets

DIRECT COMMUNICATION WITH A PROCESSOR INTERNAL TO A MEMORY DEVICE

BACKGROUND

Field of Invention

Embodiments of the invention relate generally to systems, and more particularly, to systems with one or more processors internal to a memory device.

Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Electronic systems typically include one or more processors, which may retrieve and execute instructions, and store the results of the executed instructions to a suitable output or location. A processor generally includes arithmetic logic unit (ALU) circuitry, which is capable of executing instructions such as arithmetic and logic operations on one or more operands. For example, the ALU circuitry may add, subtract, multiply, or divide one operand from another, or may subject one or more operands to logic operations, such as AND, OR, XOR, and NOT logic functions. The various arithmetic and logic operations may have different degrees of complexity. For example, some operations may be executed by inputting the operand(s) through the ALU circuitry in one cycle, while other operations may be require multiple clock cycles.

A number of components in the electronic system may be involved in directing a set of instructions to the ALU for execution. For example, the instructions and any corresponding data (e.g., the operands on which the operations will be executed) may be generated by a controller, or some other suitable processor in the electronic system. As the time or number of clock cycles required for the execution of a set of instructions may vary depending on the type of operation, the instructions and/or data may be written to a memory device, for example, a memory array, before being executed by the ALU. The instructions and data may be retrieved and sequenced and/or buffered before the ALU begins to execute the instructions on the data. To improve processing performance, the steps of writing, reading, sequencing, buffering, and executing instructions and/or data may be occurring substantially simultaneously on different instructions, or different parts of an instruction. This parallel processing may be referred to as "pipelining."

The process of executing instructions and the steps involved in pipelining instructions may consume power in the electronic system. For example, writing instructions and data to a memory array, and then retrieving the instructions for a processor to perform the operations may take energy. Furthermore, in some memory systems, an external bus may be required to input the instructions and data from a memory array to an ALU, and to output completed results back to the memory array or other suitable output. Such external data input/outputs may increase power consumption in the system.

In some memory systems, a processor may be embedded on a memory device, and may be referred to as a processor-in-memory (PIM). For example, one or more ALUs may be embedded on a memory device, and may write to and read from a memory array without an external bus. However, the transfer of instructions and data in the memory device may still limit the efficiency of processing in an electronic system.

BRIEF DESCRIPTION OF DRAWINGS

Certain embodiments are described in the following detailed description and in reference to the drawings in which.

DETAILED DESCRIPTION

Figure 1:
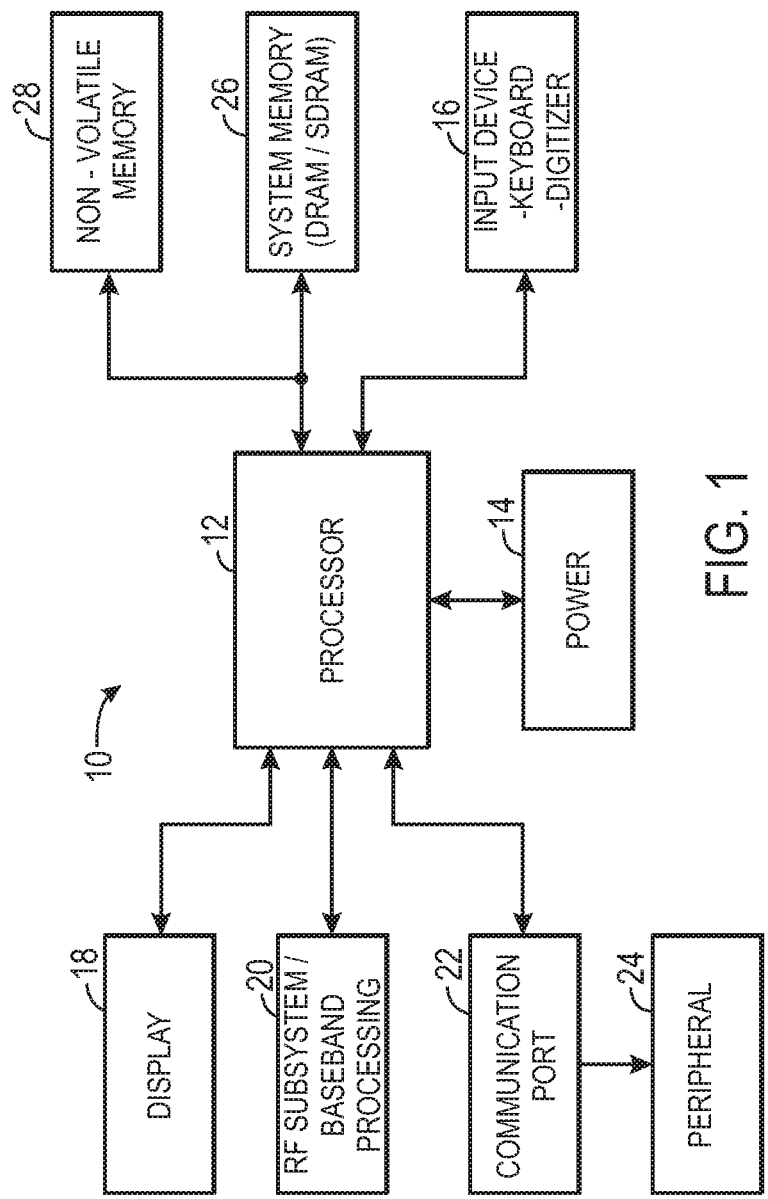
FIG. 1 depicts a block diagram of a processor-based system in accordance with an embodiment of the present technique.

Arithmetic logic unit (ALU) circuitry is generally used to process instructions in multiple stages. Processing the instructions may include executing the instructions, and storing the results of the executed instructions. More specifically, instructions, and the data on which the instructions will be executed, may be sent by a controller to the ALU, and may first be stored in a memory device to be retrieved when the ALU circuitry is available to execute the instructions. Once the instructions have been executed, the ALU may write the results of the operation to a memory component, or to any other suitable output.

In one or more embodiments of the present techniques, one or more processors, such as one or more ALUs, may be packaged with or embedded on a memory device. Such processors are hereinafter referred to as "internal processors." For example, the memory device may be a processor-in-memory (PIM), and may include embedded ALUs and a memory array, which may store instructions and data to be processed by the ALUs and the results from the completed instructions. Further, the memory device may include additional components such as a sequencer and buffer to configure and hold the instructions and/or data before the ALU executes the operations. As discussed, power may be consumed during the input of data and/or instructions from a memory component to an ALU and the output of the results from the ALU to the memory component. When the ALU is external to the memory component, an external input/output (I/O) may be employed. However, an external I/O may consume a significant amount of power from the memory system. For example, the high power consumption of an external I/O may be disadvantageous in a battery-run mobile electronic device, or in any electronic device operating on a power supply.

One embodiment of the present technique involves a memory device having an embedded processor, such as a compute engine, including one or more ALUs. As the compute engine is embedded on the memory device, no external bus may be required to communicate (e.g., transmit) information between the compute engine and the memory array. More specifically, instructions and/or data may be transmitted from the memory array to the compute engine without being routed outside (i.e., external to) the memory device. Similarly, results of completed operations may also be transmitted from the compute engine to the memory array within the memory device. A compute engine and a memory array embedded on the same memory device may eliminate the need for an external I/O between the two components, and may reduce power consumption for the electronic system.

In some electronic systems, an external processor, such as an integrated or discrete memory controller, may write data and instructions to the memory array on the memory device, and a sequencer may access the memory array to retrieve instructions while a buffer accesses the memory array to temporarily store data before the ALU is available to execute the instructions on the data. However, writing and reading information (e.g., instructions and/or data) to and from the memory array may consume power. For example, power may be consumed when the external processor writes information to the memory array, and further, when the information is retrieved for the ALU to perform the instructions.

One or more of the present techniques disclose systems and methods of sending instructions and/or data directly to a sequencer and/or buffer. In some embodiments, the instructions and/or data may be directly transmitted through an interface between an external processor, such as a memory controller, and specific components of the memory device. As used herein, "directly" transmitting information may involve directly transmitting instructions to the sequencer without first writing the instructions to a memory array, and directly transmitting data to the buffer without first writing the data to the memory array. By directly communicating (e.g., sending) instructions and/or data to the sequencer or the buffer, the additional steps of writing and retrieving instructions and/or data to and from the memory array may be eliminated. As power is consumed each time the memory array is written to or read, such techniques may further reduce power consumption of the processor.

Several of the terms used above may be used throughout the present disclosure, and definitions of such terms are provided to facilitate a better understanding of the present techniques. A processor may be a compute engine, and may include one or more ALUs. As used herein, a compute engine may be a plurality of ALUs embedded on a memory device. The ALUs and a memory component, such as a memory array, may be on the same memory device. The compute engine may be controlled by a processor (e.g., a discrete controller or a controller integrated with a processor that performs other functions) not embedded on the memory device, and this processor may be referred to as an "external processor." The external processor may send "instructions," which refer to the task to be executed by the compute engine, which may also be referred to as "operations." For example, instructions may include arithmetic or logic operations, or any other task which an ALU may be suitable for performing. Instructions may sometimes require more than one "cycle," or more than one pass through one or more ALUs, before the instruction has been completely executed. "Operands" may refer to the data on which operations are executed, and depending on the instruction, one or more operands may be input into the ALU circuitry at the same time. Additionally, in some operations, an operand may be input through an ALU in one cycle, and carried out of the ALU and back into the ALU as an operand for an additional cycle(s). An "interface" may refer to an operable coupling, such as an electrical connection, between a memory system having an embedded ALU and an external processor, such as an external memory controller. As will be explained, instructions, data, or other information may be transmitted through different types of interfaces between the memory system and the external processor.

Now turning to the figures, FIG. 1 depicts a processor-based system, generally designated by reference numeral 10. As is explained below, the system 10 may include various electronic devices manufactured in accordance with embodiments of the present technique. The system 10 may be any of a variety of types such as a computer, pager, cellular phone, personal organizer, control circuit, etc. In a typical processor-based system, one or more processors 12, such as a microprocessor, control the processing of system functions and requests in the system 10. As is explained below, the processor 12 and other subcomponents of the system 10 may include resistive memory devices manufactured in accordance with one or more embodiments of the present technique.

The system 10 typically includes a power supply 14. For instance, if the system 10 is a portable system, the power supply 14 may advantageously include a fuel cell, a power scavenging device, permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance.

Various other devices may be coupled to the processor 12 depending on the functions that the system 10 performs. For instance, an input device 16 may be coupled to the processor 12. The input device 16 may include buttons, switches, a keyboard, a light pen, a mouse, a digitizer and stylus, and/or a voice recognition system, for instance. A display 18 may also be coupled to the processor 12. The input device 16 and/or the display 18 may each or both form a user interface. The display 18 may include an LCD, an SED display, a CRT display, a DLP display, a plasma display, an OLED display, LEDs, and/or an audio display, for example. Furthermore, an RF sub-system/baseband processor 20 may also be coupled to the processor 12. The RF sub-system/baseband processor 20 may include an antenna that is coupled to an RF receiver and to an RF transmitter (not shown). One or more communication ports 22 may also be coupled to the processor 12. The communication port 22 may be adapted to be coupled to one or more peripheral devices 24 such as a modem, a printer, a computer, or to a network, such as a local area network, remote area network, intranet, or the Internet, for instance.

The processor 12 generally controls the system 10 by executing instructions stored in the memory to implement software programs. The software programs may include an operating system, database software, drafting software, word processing software, and/or video, photo, or sound editing software, for example. The memory is operably coupled to the processor 12 to store and facilitate execution of various programs. For instance, the processor 12 may be coupled to the system memory 26, which may include dynamic random access memory (DRAM), and/or synchronous dynamic random access memory (SDRAM). The system memory 26 may include volatile memory, non-volatile memory, or a combination thereof. The system memory 26 is typically large so that it can store dynamically loaded instructions for applications and data.

The processor 12 may also be coupled to non-volatile memory 28, which is not to suggest that system memory 26 is necessarily volatile. The non-volatile memory 28 may include read-only memory (ROM), such as an EPROM, resistive read-only memory (RROM), and/or flash memory to be used in conjunction with the system memory 26. The size of the ROM is typically selected to be just large enough to store any necessary operating system, application programs, and fixed data. Additionally, the non-volatile memory 28 may include a high capacity memory such as a tape or disk drive memory, such as a hybrid-drive including resistive memory or other types of non-volatile solid-state memory, for instance.

Figure 2:
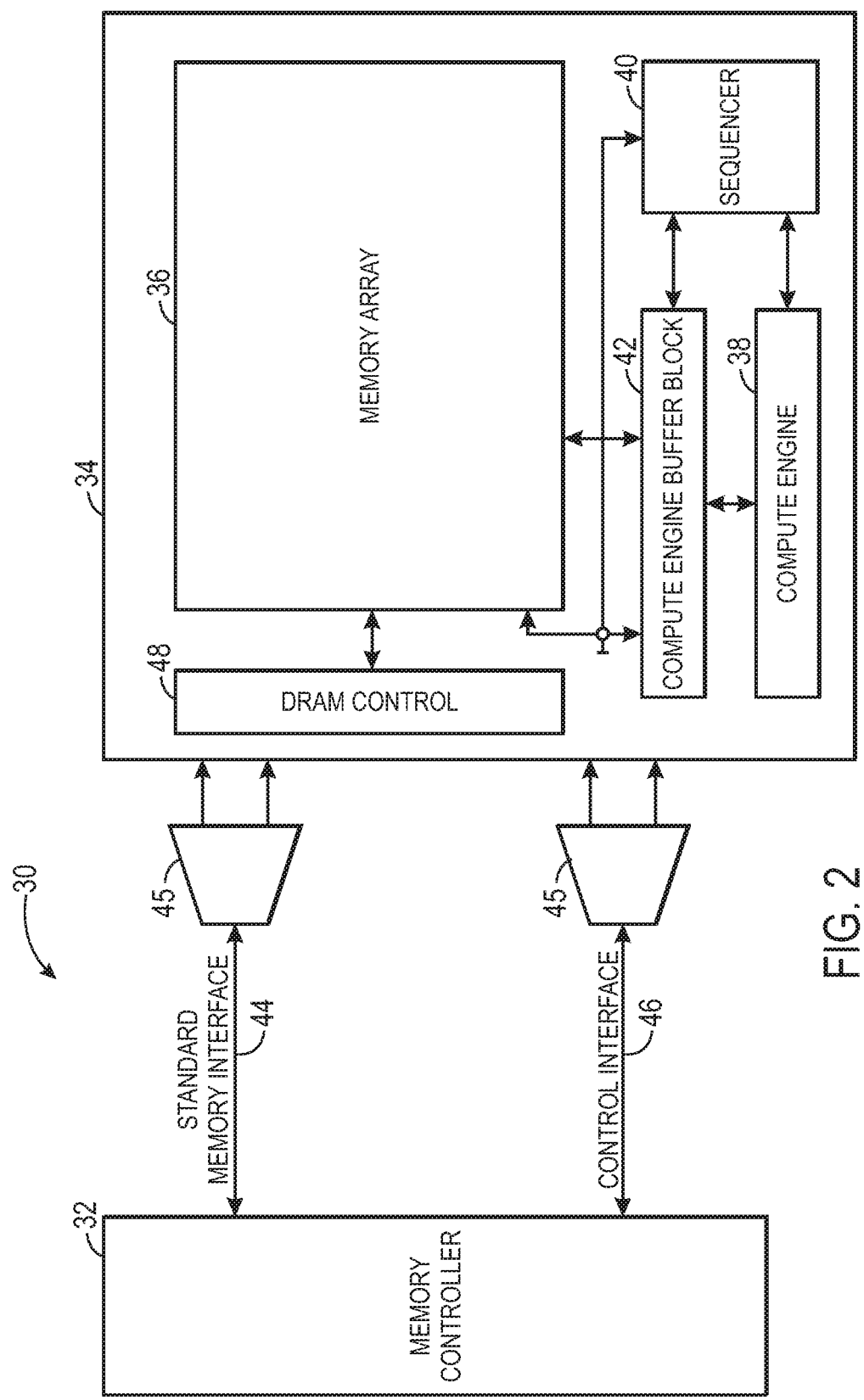
FIG. 2 depicts a block diagram of a random access memory (RAM) system with embedded arithmetic logic units interfaced with a system on a chip (SOC) having a RAM controller, in accordance with an embodiment of the present technique.

One or more embodiments of the present techniques involve the communication between the processor 12 and components of the system memory 26. More specifically, the processor 12 may include a general purpose processor, a central processing unit, a processor core, an ASIC, a memory controller, and/or an ALU, for example, capable of sending and receiving signals from internal processors packaged with (e.g., embedded on) memory devices in the system memory 26. Components of the system 10 involved in the communication between the processor 12 and the components of the system memory 26 may be generally referred to as a "memory system" 30, as illustrated in the block diagram of FIG. 2. In some embodiments, a memory system 30 may include a memory device 34, which may be part of the system memory 26 of the system 10 (as in FIG. 1) and may have an internal processor. The memory system 30 may also include an external processor 32, which may be in a system-on-a-chip (SOC) with a more general purpose to collectively form a processor 12 of a processor-controlled system 10 (as in FIG. 1), for example. The external processor 32 may communicate with certain components of a memory device 34.

The memory system 30 may include components which have functions that are not limited to the communication between the external processor 32 and the memory device 34. For example, the external processor 32 may control devices in addition to the memory device 34. However, the external processor 32, as explained with respect to the memory system 30, may refer to one function of the external processor 32 which communicates with and/or controls certain components of the memory device 34. Likewise, not all parts of the system memory 26 may be part of the memory system 30. The "memory device" 34 may refer to components of the system memory 26 involved in the communication with the external processor 32, in accordance with the present techniques.

The external processor 32 and the memory device 34 may be operably coupled by a standard memory interface 44, which may allow data transfer between the external processor 32 and the memory device 34, and may allow the external processor 32 to send (e.g., transfer) commands to the memory device 34. In one or more embodiments, the types of standard memory interface 44 may include DDR, DDR2, DDR3, LPDDR, or LPDDR2, for example. Further, in some embodiments, an additional interface(s) may be configured to allow the transfer of data, and also commands (e.g., requests, grants, instructions, etc.), between the memory device 34 and the external processor 32. For example, the external processor 32 and the memory device 34 may also be operably coupled by a control interface 46, which may allow the transfer of commands between the external processor 32 and the memory device 34, including commands from the memory device 34 to the external processor 32. Both the standard memory interface 44 and the control interface 46 may include a multiplexer 45 to allow communication (e.g., data, commands, etc.) between the external processor 32 and different components of the memory device 34 (e.g., the memory array 36, the sequencer 40, the compute engine buffer block 42, etc.)

The memory device 34 may include a memory array 36 and an internal processor, such as a compute engine 38. The memory array 36 may refer to any suitable form of storage, and may include, for example, a DRAM array or an SDRAM array. The external processor 32 may have access to the memory array 36, and may be able to send data or instructions to be executed by the compute engine 38. The compute engine 38 may include one or more arithmetic logic units (ALUs), or any other circuitry which may be capable of performing instructions sent from another processor (e.g., a memory controller), including, for example, arithmetic operations such as addition, subtraction, multiplication, and division, and logic functions such as AND, OR, XOR, and NOT functions.

The compute engine 38 may be embedded on the memory device 34 and capable of accessing the memory array 36, including retrieving information from, and storing information to the memory array 36. In some embodiments, the compute engine 38 may access information from the memory array via a sequencer 40 and compute engine buffer block 42. The sequencer 40 may organize (e.g., sequence) the instructions sent by the external processor 32 to the memory array 36 and store the data retrieved by the memory array 36 in the compute engine buffer block 42. Once the compute engine 38 has executed the instructions, the results may be stored in the compute engine buffer block 42 before they are written to the memory array 36. Further, as some instructions may require more than one clock cycle in the compute engine, intermediate results may also be stored in the compute engine buffer block 42. In some embodiments, the compute engine buffer block 42 may include more than one layer of buffers. For example, the buffer block 42 may include a compute buffer, which may store operands, and/or an instruction buffer, which may store instructions. The buffer block 42 may also include additional buffers, such as a data buffer or a simple buffer, which may provide denser storage, and may store intermediate or final results of executed instructions.

Figure 3:
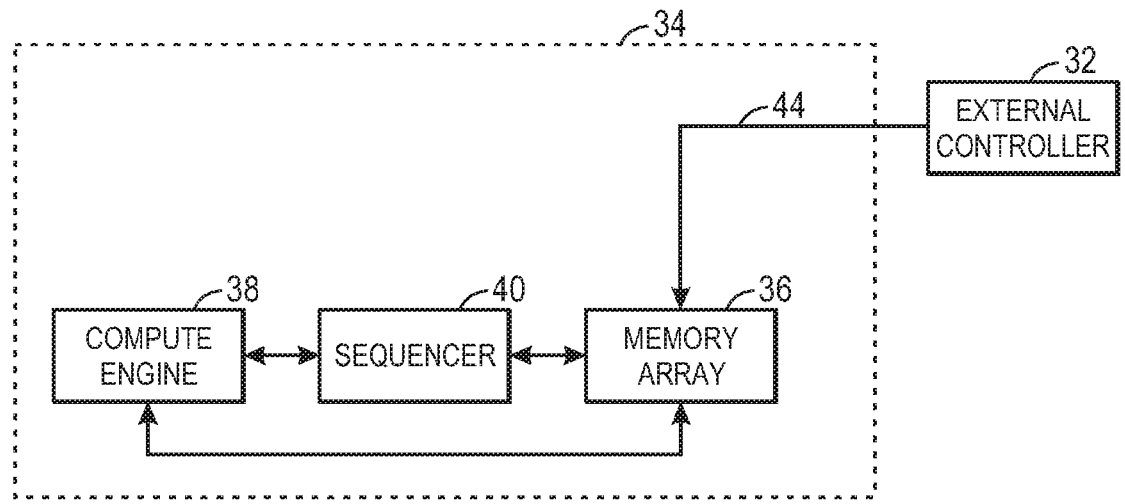
FIG. 3 depicts a block diagram of a command path from the SOC to the DRAM array.

In a typical memory system 30, an external processor 32 may write operands and instructions to the memory array 36 on the memory device 34. A sequencer 40 may access the memory array 36 to retrieve the instructions, and may copy the operands from the memory array 36 to the compute engine buffer block 42. For example, a depiction of how information may typically be written to a memory array 36 is provided in the block diagram of FIG. 3. The external processor 32 may send instructions through a standard memory interface 44 to the memory array 36, and a sequencer 40 accesses the memory array 36 to sequence the instructions for the compute engine 38. However, power is consumed when the external processor 32 writes the instructions to the memory array 36, and when the sequencer 40 reads the instructions from the memory array 36.

Figure 4:
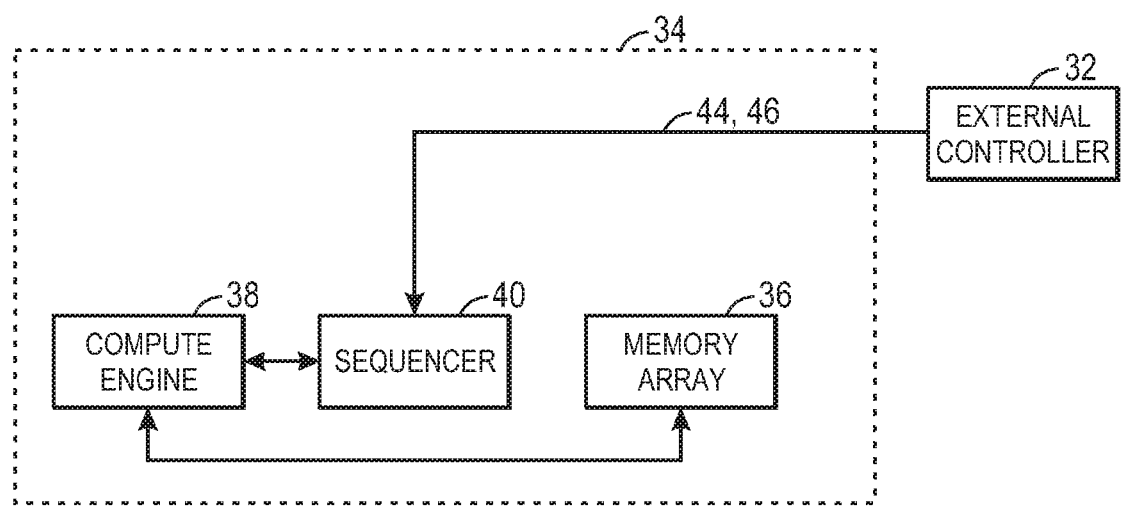
FIG. 4 depicts a block diagram of a command path from the SOC to the sequencer, in accordance with one or more embodiments of the present technique.

In one embodiment of the present techniques, power may be conserved by eliminating the step of transmitting instructions to and from the memory array 36. A block diagram depicting one embodiment is presented in FIG. 4, where the external processor 32 may transmit instructions directly to the sequencer. For example, instructions may be transmitted through either a standard memory interface 44, or through a control interface 46. As discussed, the control interface 46 may also allow the sequencer 40 or the compute engine 38 to directly communicate with the external processor 32. Writing to and reading from the memory array 36 may be reduced, as the sequencer 40 may not need to access the memory array 36 for each instruction to be sequenced. Rather, the sequencer 40 may configure (i.e., sequence, organize, set up registers, etc.) the instructions for the compute buffer 38 when instructions are received directly from the external processor 32. As indicated by the bidirectional arrow between the compute engine 38 and the memory array 36, results of operations completed by the compute engine 38 may still be sent to the memory array 36. In some embodiments, instructions being transmitted into and out of the memory device 34 may first be sent to the compute engine buffer block 42 (as in FIG. 2). Furthermore, in other embodiments, the instructions may be sent to different components of the memory device 34 depending on an application, or the instructions to be executed. Instructions may be communicated (e.g., transferred, transmitted or otherwise sent) directly to any of the sequencer 40, the memory array 36, or the compute engine buffer block 42, and the signal carrying the instructions may also carry an identifier, additional bits, or some other indicator to indicate that the instructions are targeted for a particular component of the memory device 34.

Figure 5:
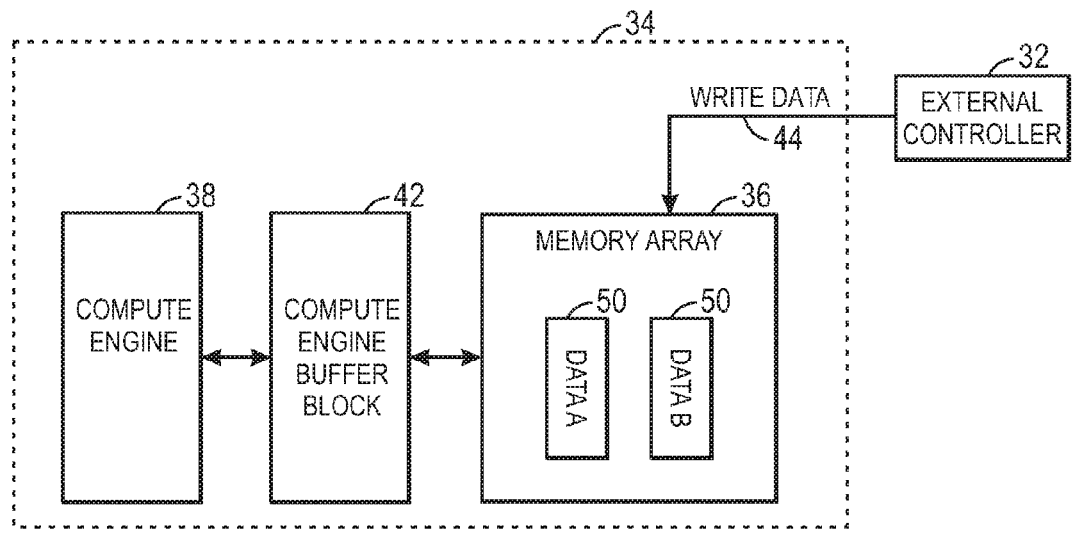
FIG. 5 depicts a block diagram of a data path from the SOC to the DRAM array.

One or more of the present techniques can also include systems and methods of sending data from an external processor 32 directly to a compute engine buffer block 42. In a typical memory system, a processor may write data to a memory array before the data is retrieved for operation. An illustration of a data path from an external processor 32 to a memory array 36 is provided in the block diagram of FIG. 5. The data 50, shown as data A and B, may be operands to be executed (e.g., operated on) by the compute engine 38. Before the compute engine 38 may operate on the data 50, a sequencer 40 (as in FIG. 2, not shown in FIG. 5) may copy the data 50 from the memory array 36 to the compute engine buffer block 42. The data 50 may then be maneuvered in the buffer block 42 to be operated on by the compute engine 38.

Figure 6:
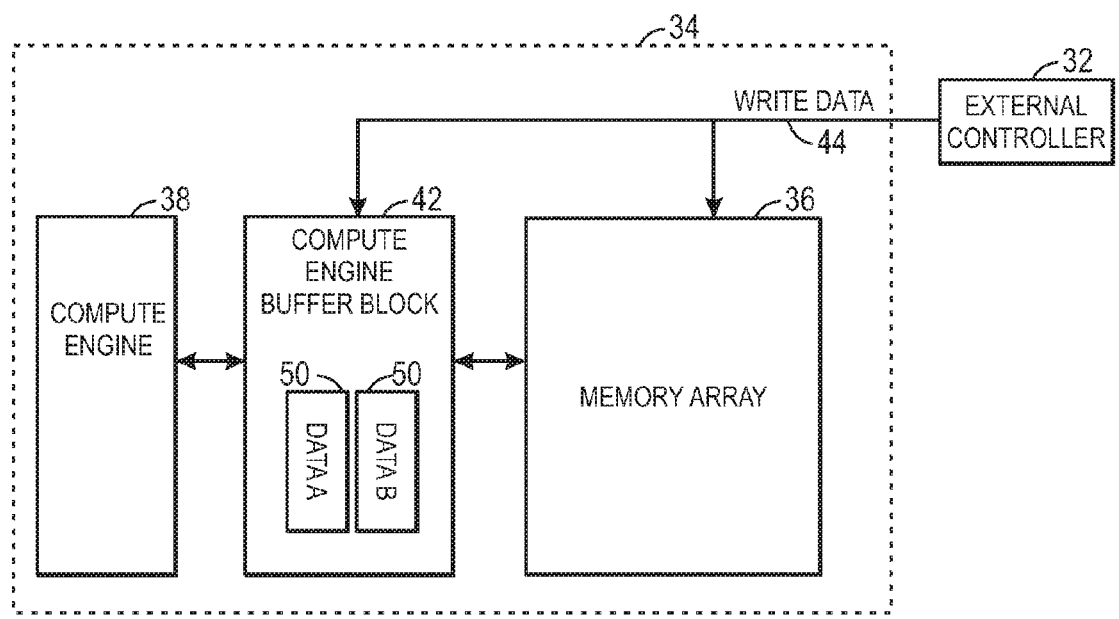
FIG. 6 depicts a block diagram of a data path from the SOC to either the compute engine buffer block, or the DRAM array, in accordance with one or more embodiments of the present technique.

In one embodiment, data writing to the memory array 36 and the data reading from the memory array 36 may be reduced, which may conserve the power required to write to and read from the memory array 36. As illustrated in the block diagram of FIG. 6, the external processor 32 may send (e.g., write) data directly to the compute engine buffer block 42 via the standard memory interface 44. Though the external processor 32 and the buffer block 42 may still have access to the memory array 36, certain data 50 may be directly sent to the buffer block 42, such as to reduce the power consumed in writing and reading to and from the memory array 36. Thus, a sequencer 40 (as in FIG. 2, not shown in FIG. 6), may read data from the compute engine buffer block 42 to be operated on by the compute engine 38.

As discussed, in some embodiments, the data 50 may be sent to different components of the memory device 34 depending on an application, or the data to be operated on. The data 50 may be sent directly to either the memory array 36, the compute engine buffer block 42, or some other component on the memory device 34, and the data signal may also carry an identifier, additional bits, or some other indicator to indicate that the data 50 is targeted for a particular component of the memory device 34.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
    an external processor; and
    a processor-in-memory (PIM) communicatively coupled to the external processor, wherein the PIM comprises:
        a single chip;
        a memory array configured to store data;
        a buffer in the single chip, wherein the buffer is configured to receive operand data directly from the external processor without first storing the operand data in the memory array; and
        an internal processor communicatively coupled to the buffer, wherein the internal processor is configured to:
            receive the operand data from the buffer; and
            process the operand data by performing an arithmetic operation, a logic operation, or both based at least in part on the operand data.

2. The system, as set forth in claim 1, comprising an interface communicatively coupled between the external processor and the buffer.

3. The system, as set forth in claim 1, wherein the external processor is configured to communicate with one or more of the internal processor and a sequencer on the PIM.

4. A system comprising:
    an external processor; and
    a processor-in-memory (PIM) communicatively coupled to the external processor, wherein the PIM comprises:
        a single chip;
        a memory array configured to store data;
        a sequencer in the single chip, wherein the sequencer is configured to receive instruction data directly from the external processor without first storing the instruction data in the memory array; and
        an internal processor communicatively coupled to the sequencer, wherein the internal processor is configured to:
            receive the instruction data from the sequencer; and
            process the instruction data by executing the instruction data to perform an arithmetic operation, a logic operation, or both.

5. The system, as set forth in claim 4, wherein the PIM is configured to write a result from processing the instruction data to the memory array, a buffer in the PIM, or both.

6. The system, as set forth in claim 4, wherein the internal processor comprises one or more arithmetic logic units (ALUs) embedded in the single chip.

7. A method of operating a processor-in-memory (PIM), comprising:
    receiving, using a sequencer in the PIM, instruction data directly from an external processor without first storing the instruction data in a memory array of the PIM, wherein the PIM comprises a single chip and the external processor is external to the PIM;
    receiving, using a buffer in the PIM, operand data directly from the external processor without first storing the operand data in the memory array; and
    sequencing, using the sequencer, execution order of the instruction data to be executed by an internal processor of the PIM to perform an operation based at least in part on the operand data.

8. The method, as set forth in claim 7, wherein:
receiving the instruction data comprises receiving the instruction data via an interface communicatively coupled between the external processor and the PIM without storing the instruction data in a memory array of the PIM; and
receiving the operand data comprises receiving the operand data via the interface.

9. The method, as set forth in claim 7, comprising setting up registers to be used by the internal processor to perform the operation.

10. The method, as set forth in claim 7, wherein the operation comprises an arithmetic operation, a logic operation, or both.

11. The method, as set forth in claim 7, comprising:
receiving, using the PIM, a signal comprising data and identifier bits; and
determining, using the PIM, a target component to receive the data based at least in part on the identifier bits.

12. The method, as set forth in claim 7, comprising executing, using the internal processor, to perform the operation.

13. The method, as set forth in claim 7, wherein the internal processor comprises one or more arithmetic logic units.

14. A processor-in-memory (PIM) comprising:
a single chip;
a memory array configured to store data;
a sequencer in the single chip, wherein the sequencer is configured to:
receive instruction data directly from an external processor via an interface, wherein the instruction data is not stored in the memory array and the external processor is external to the PIM; and
organize execution order of the instruction data upon receiving the instruction data; and
an internal processor communicatively coupled to the processor, wherein the internal processor is configured to execute the instruction data based at least in part on organization of the instruction data performed by the sequencer to perform an operation in the PIM.

15. The PIM, as set forth in claim 14, comprising a buffer in the signal chip, wherein configured to receive operand data directly from the external processor via the interface.

16. The PIM, as set forth in claim 15, wherein:
the internal processor is configured to execute the instruction data to perform the operation based at least in part on the operand data; and
the operation comprises an addition operation, a subtraction operation, a multiplication operation, a division operation, an AND operation, an OR operation, an XOR operation, a NOT operation, or any combination thereof.

17. The PIM, as set forth in claim 15, comprising an external input/output (I/O) operably coupled to the buffer and the sequencer, wherein the external I/O is configured to receive the operand data and the instruction data from the external processor.

18. A system comprising:
an external processor; and
a processor-in-memory (PIM) communicatively coupled to the external processor, wherein the PIM comprises:
a single chip;
a memory array configured to store data;
a buffer in the single chip, wherein the buffer is configured to receive first operand data directly from the external processor without the first operand data being stored in the memory array;
a sequencer in the single chip, wherein the sequencer is configured to receive instruction data directly from the external processor without the instruction data being stored in the memory array; and
an internal processor communicatively coupled to the buffer and the sequencer, wherein the internal processor is configured to:
receive the instruction data from the sequencer;
receive the first operand data from the buffer; and
execute the instruction data to perform an operation based at least in part on the first operand data.

19. The system, as set forth in claim 18, wherein the memory array configured to receive data from the external processor.

20. The system, as set forth in claim 18, comprising a memory interface communicatively coupled between the external processor and the PIM, wherein the memory interface is configured to enable the external processor to selectively send second operand data directly to the buffer or directly to the memory array based at least in part on identifier bits in the second operand data.

21. The system, as set forth in claim 20, wherein:
the memory interface comprises a multiplexer; and
the identifier bits are configured to indicate a target component in the PIM.

22. The system, as set forth in claim 18, comprising a control interface communicatively coupled between the external processor and the PIM, wherein the control interface is configured to enable the sequencer to receive the instruction data directly from the external processor.

23. The system, as set forth in claim 18, comprising a memory interface communicatively coupled between the external processor and the PIM, wherein:
the memory interface is configured to communicate a signal directly from the external processor to the PIM; and
the signal comprises the instruction data and an indicator configured to indicate that a target component of the signal is sequencer.

24. The system, as set forth in claim 18, comprising a control interface communicatively coupled between the external processor and the PIM, wherein the control interface is configured to enable the external processor to communicate directly with both the buffer and the sequencer.

25. The system, as set forth in claim 18, comprising a memory interface communicatively coupled between the external processor and the PIM, wherein the memory interface configured to enable the external processor to communicate a signal to the PIM, wherein the signal comprises an indicator configured to indicate whether a target component of the signal is the buffer, the sequencer, or the memory array.

26. The system, as set forth in claim 18, wherein the buffer comprises one or more buffer layers.

27. The system, as set forth in claim 18, wherein the external processor comprises:
a discrete memory controller; or
a processor comprising an integrated memory controller.

28. The system, as set forth in claim 18, wherein the internal processor is packaged in the PIM.

29. The system, as set forth in claim 18, wherein the internal processor is embedded in the single chip.

* * * * *